United States Patent [19]

Lynch

[11] 4,348,038

[45] Sep. 7, 1982

[54] MAP

[76] Inventor: Peter Lynch, 134 Carlton Ave., Toronto, Canada, M5B 2G2

[21] Appl. No.: 153,384

[22] Filed: May 27, 1980

[51] Int. Cl.³ .................. G09B 29/04; B42D 1/04
[52] U.S. Cl. ................................ 283/34; 281/3 R
[58] Field of Search .............. 283/34, 35, 36, 32; 434/147; 281/2, 15 R, 38

[56] References Cited

U.S. PATENT DOCUMENTS

| | | | |
|---|---|---|---|
| 592,981 | 11/1897 | Bowker | 281/15 R |
| 1,569,390 | 1/1926 | Parker | 283/35 X |
| 1,778,766 | 10/1930 | McMichael | 281/38 X |
| 1,787,276 | 12/1930 | Jones | 281/15 R |
| 1,921,332 | 8/1933 | Sanwald | 283/35 |
| 2,118,964 | 5/1938 | Bonnaire | 283/34 X |
| 2,190,438 | 2/1940 | Vogt | 283/34 X |
| 2,316,786 | 4/1943 | Gottlieb | 283/34 X |
| 2,615,732 | 10/1952 | Falk | 283/34 |
| 4,030,218 | 6/1977 | Stockwell | 283/34 |
| 4,270,773 | 6/1981 | Gaetano | 283/34 |

FOREIGN PATENT DOCUMENTS

| | | | |
|---|---|---|---|
| 454195 | 1/1950 | Italy | 283/34 |
| 255484 | 7/1926 | United Kingdom | 283/34 |

Primary Examiner—Paul A. Bell
Assistant Examiner—John S. Brown
Attorney, Agent, or Firm—Hirons, Rogers & Scott

[57] ABSTRACT

This invention provides an improved map having the advantages of a book while at the same time providing a simple index system, and pages which are folded to provide a larger format than that normally found in a book. The folded pages are arranged so they cannot be readily damaged by incorrect folding and yet the pages can be inter-related imperfectly without damage and without affecting the index arrangement.

3 Claims, 5 Drawing Figures

MAP

This invention relates to maps and in particular to a type of map which is bound for convenient, ready reference.

In this application, the term "map" is used to include scale representations of street plans, road systems, charts, plans and any other printed layouts showing the positional relationships of objects, localities and regions.

There are two common types of maps. The first type consists of a relatively large sheet of paper on which the map is printed. The sheet is folded into a convenient size for storage. This type of map is relatively inexpensive to produce, but has a distinct disadvantage in that the user must open the map out fully if he is to comprehend the meaning of any particular part of the map. Quite often this disadvantage is emphasized because the index is printed on the reverse side of the map. Consequently the map is inconvenient both when the map is used in a confined space such as in a car and also when it is used outside where wind would tend to make it impractical. Further, once the map has been used it must be folded and quite often the user finds it difficult to refold the map into its original folded condition. As a result the map is folded improperly and quite soon the paper weakens and the map begins to disintegrate.

A second type of map is in the form of a paperback pocket book. This type of map is certainly more convenient than the first type, but is relatively more expensive to produce. It also suffers from the disadvantage that the convenient size of the book limits the size of page and consequently the amount of information carried by each page. Metropolitan areas must be broken down into a large number of smaller areas so that quite often the user will find that the particular part of the map required lies partly on one page and partly on another in a different part of the book. This makes the book somewhat awkward to use and requires that the user relates the pages mentally.

It is also desirable that a map have an index and that the index be in a form which is readily understood and remembered by the user so that items found in the index can then be found on the map. The first type of map discussed has a distinct advantage in this respect because generally the index refers only to two grid references. This contrasts with a book which generally requires firstly a page number, and then two grid references. Often a street will run through several pages so at a minimum the user of the book must remember three references in order to locate something found in the index on one page but may have to refer to several pages each requiring use of three references.

The present invention is intended to provide an improved map having the advantages of a book while at the same time providing a simple index system, and pages which are folded to provide a larger format than that normally found in a book. The folded pages are arranged so they cannot be readily damaged by incorrect folding and yet the pages can be inter-related imperfectly without damage and without affecting the index arrangement.

The invention will be better understood with reference to the drawings, in which.

Figure 1:
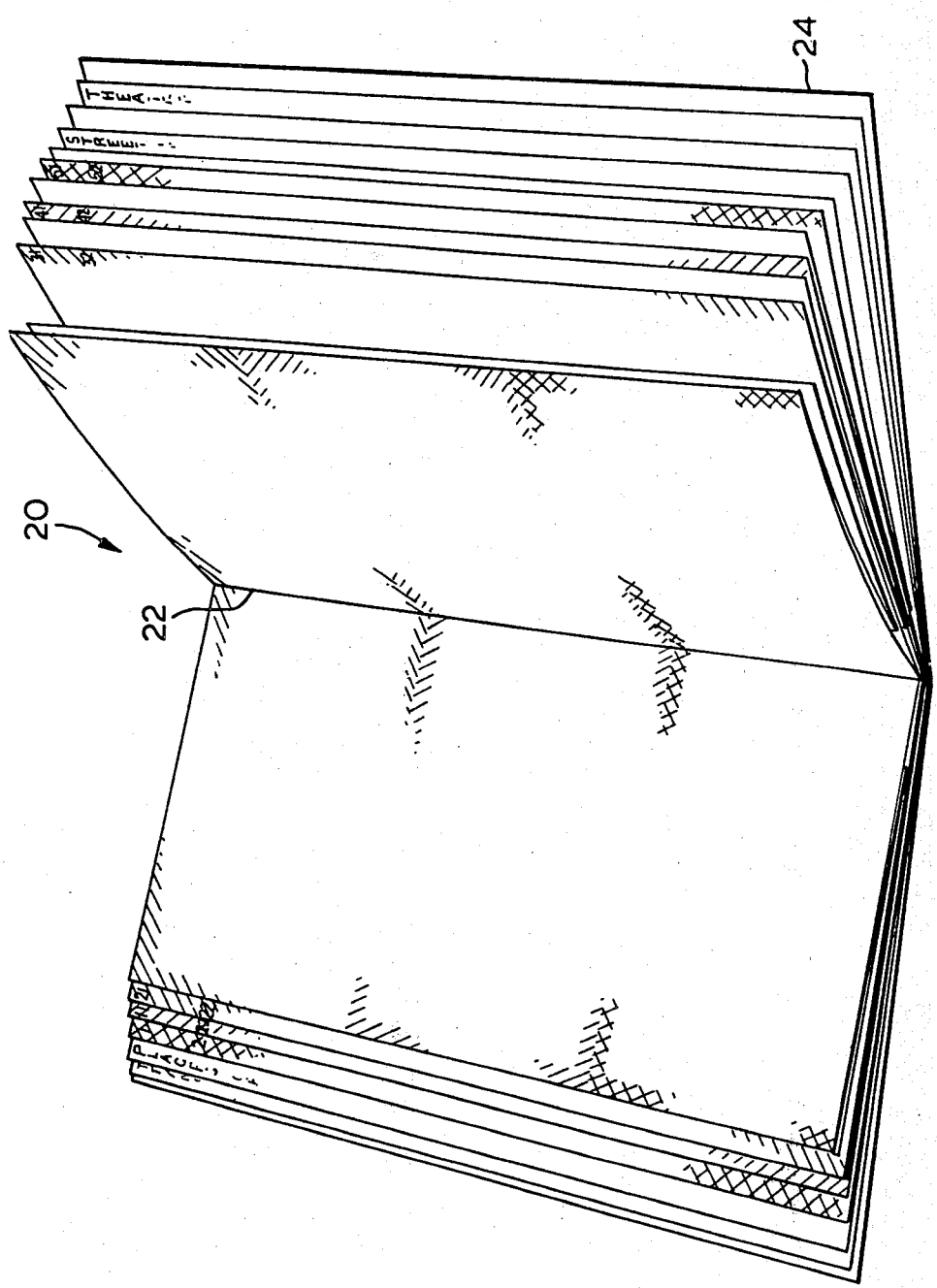
FIG. 1 is a simplified perspective view of a preferred embodiment of a map according to the invention and shown in a perspective arrangement with the map open at its centre.

Reference is first made to FIG. 1 which is a simplified illustration of a map according to the invention to show the general arrangement of the map. The map is designated generally by the numeral 20 and is symmetrical about a spine 22. The map includes a relatively stiff cover 24 protecting a series of pages forming the map. It will be seen that these pages are of differing sizes for indexing purposes as better seen in FIG. 2.

Figure 2:
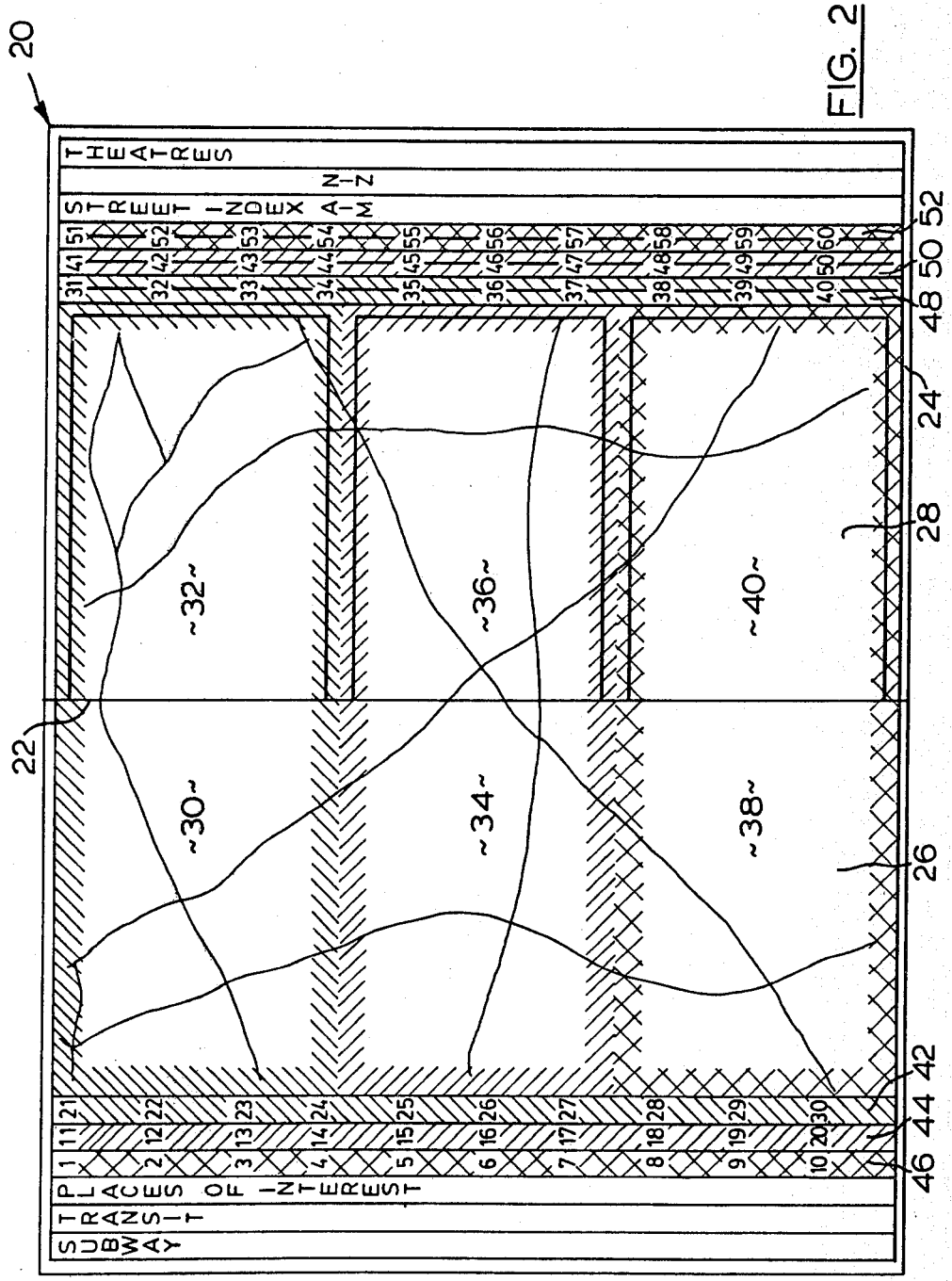
FIG. 2 is a view looking down on the map shown in FIG. 1 and illustrating the reference system used in the map.

As seen in FIG. 2, the map 20 includes center pages 26, 28 which illustrate a geographical area contained in the map. These pages show the area to a smaller scale and the area is broken into six sections, three on each of the pages. Starting from the top as drawn, sections 30, 32 are bordered in a first colour (indicated by inclined shading). Next, two sections 34, 36 are bordered by a different colour and at the bottom, section 38, 40 are bordered by a third colour. In order to reduce the number of colours required and to maintain a distinction between sections 30 and 32, sections 34 and 36 and sections 38 and 40, the sections 32, 36, 40 have a solid line running through the colour.

Under the page 26 lie folded pages 42, 44, and 46. Similarly, pages 48, 50, and 52 lie under page 28. It will be seen that the pages are staggered and that the edges visible to the user are both coloured to match the borders around the sections 30, 32, etc. and numbered to form one part of a grid reference. The use of the map will be described later, but for the moment it is sufficient to understand that if the user wishes to examine one of the sections shown on pages 26, 28 to a larger scale and in detail, then he will choose the section of interest and using the coloured border as a guide, proceed to one of the pages matching this colour. On the right hand side the colours have a line running through to indicate that they correspond to the sections 32, 36 and 40 whereas on the other side the colours are plain corresponding to the sections 30, 34 and 38.

The map also includes pages of information and more particularly a street index. All of these pages have projecting ends visible when the map is opened at the middle as shown in FIG. 2.

Figure 3:
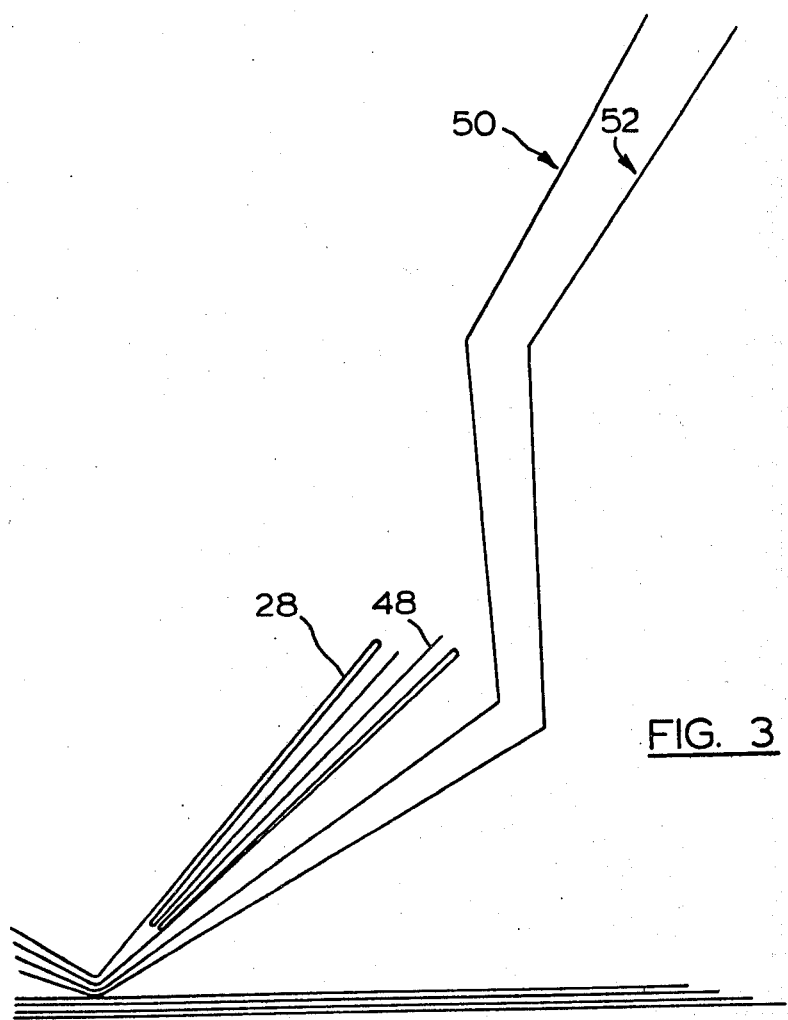
FIG. 3 is an end view of one-half of the map showing some of the pages opened out.
Figure 4:
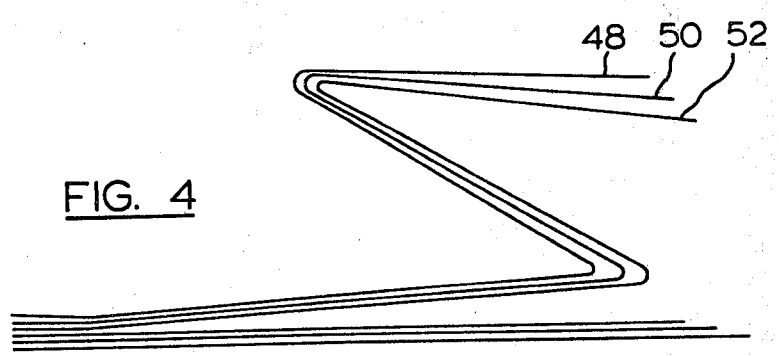
FIG. 4 is a view similar to FIG. 3 showing a further arrangement of the pages.

Before explaining more fully the use of the map, FIGS. 3 and 4 will be described to explain the structure of the pages. As seen in FIG. 3, page 28 is made up of three panels arranged in a generally Z-shaped configuration. Counting from the outer extremity of the page, the first panel lies below the second panel which is in turn below the third panel. By contrast, pages 48, 50, and 52 are normally arranged with a first panel superimposed on the second panel which in turn lies on top of the third panel. Page 48 illustrates this normal position whereas pages 50, 52 are opened out into a position in which they would normally be used as will be described. The pages containing the index, etc. are single pages of differing sizes, but of course could also be folded pages such as pages 48, 50, and 52.

A feature of the present map is that although a user may open out the pages 48, 50, and 52 and then proceed to fold them randomly, it is impossible to fold them in such a way that they would be damaged. Further, although the folding is incorrect, the next time the map is used the user would see the ends of the pages in the same arrangement as shown in FIG. 2. This is best illustrated in FIG. 4. Here it will be seen that the pages 48, 50, and 52 are folded after first arranging them in face-to-face contact. The proportions of the panels making up the pages are such that the folding shown in FIG. 4 is possible to the point where the pages are folded completely and will appear as shown in FIG. 2. The next time the user pulls out a particular page, it will automatically separate itself from the other pages which will tend to fall back into the map in the correct arrangement. Consequently, an impatient user will find that the map can be folded back into a generally book format quickly and without damage although the arrangement may not be the same as it was when the map was purchased. This is a distinct advantage of the map because the map will tend to last longer and yet provides some of the advantages of a large format folding map while retaining the advantages of a book map.

Figure 5:
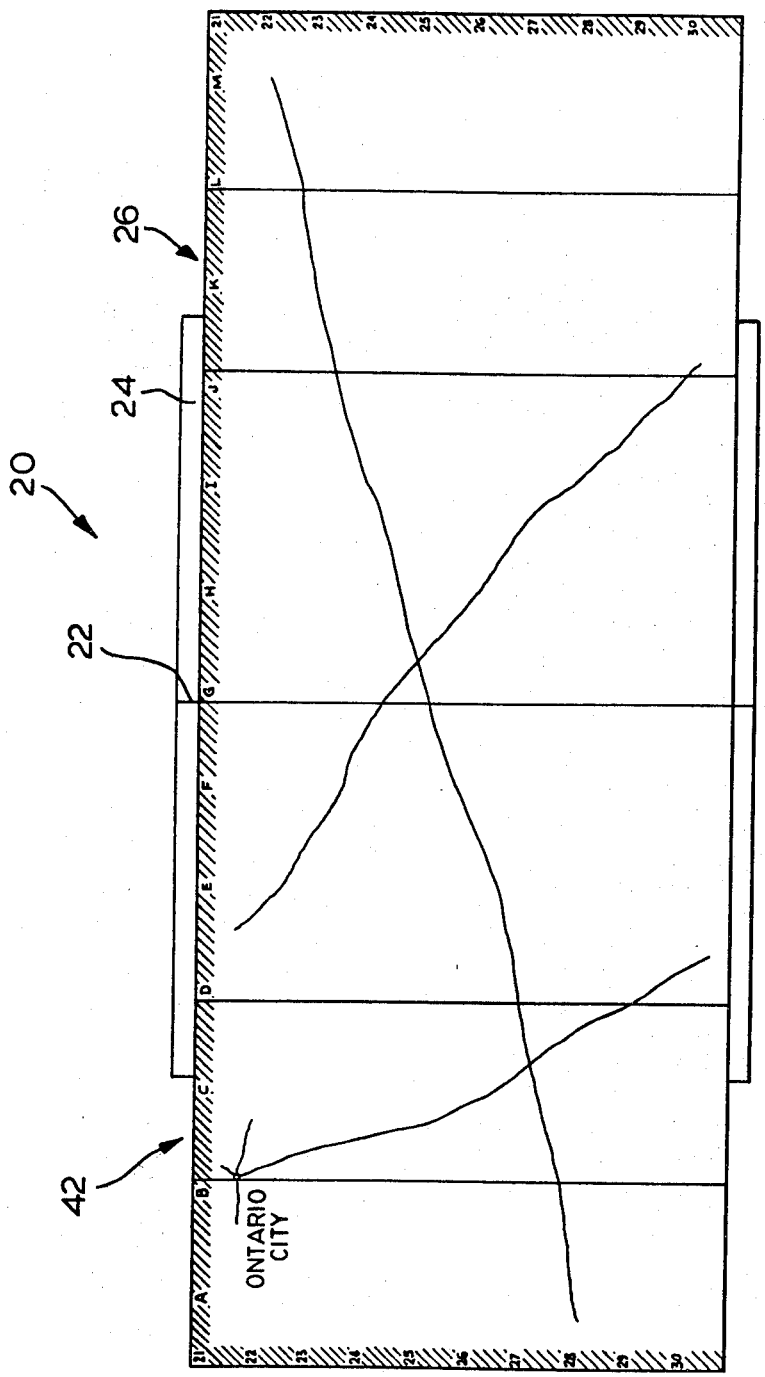
FIG. 5 is a view looking down on part of the map open to illustrate use of the map.

The use of the map will now be described. Firstly, as seen in FIG. 2 the layout of the area covered by the map is shown in small scale on pages 26 and 28. The map will be used in two basic conditions. Firstly, a user will puruse pages 26 and 28 and decide which of the sections is of interest or secondly, the user will be aware of a location on the map and will use the index to find that location on detail maps. Initially, consider the situation where the user decides that section 30 is of interest. This is on the left side of the spine and is colour coded directing the user to a similar colour on one of the pages 42, 44 and 46. In this instance page 42 is selected and the user then grips the end of page 42 and pulls it outwardly. Next, the page 26 is turned over exposing the other side of the page and providing a layout such as that shown in FIG. 5. It will be seen that the area provided corresponds to that of section 30 to a larger scale and that the area has co-ordinates A to N and 21 to 30. Although the letter co-ordinates are not shown on pages 26, 28 they can of course be included for further reference.

Once the user has finished with section 30, the map is readily folded into its original condition and if the user wishes to consult an adjacent section he is led by the arrangement on pages 26, 28 to the relevant pages showing the next required section.

Now consider the situation where a user wishes to find a particular location. Referring to the index for an exemplary location "Ontario City", he would find that it is denoted 21-B. Then, returning to the map in the arrangement shown in FIG. 2 he would find the page on which there is a co-ordinate 21 and open that page out. Then, turning page 26 over he would continue to expose the sheet shown in FIG. 5 and referring to the co-ordinates 21 and B he would find Ontario City.

It will be evident that the pages can be arranged differently within the scope of the invention. For instance the pages 26, 28 could be single panels and the number of pages folded into three panels could be increased. Similarly, it may be possible to reduce the number of simple pages used for "subway", "transit", "places of interest", etc., by using more pages folded into panels.

In general, the invention provides a method of making a book map while at the same time retaining some of the advantages of a large fold-out map.

It is significant to note that each of the pages described forms one half of a sheet. The other half of the sheet forms a similar page on the other side of the spine. This construction provides a map having a relatively small number of sheets while nevertheless providing a large surface area.

What I claim as my invention is:

1. A map illustrating a subject pictorially in sections, the map comprising a plurality of pages and means coupling the pages to one another at a spine so that with the map open at its centre pages, there are centre pages at both sides of the spine showing the subject to a small scale broken into said sections, each of the sections carrying identifying coding and each of the pages below these centre pages being larger than the centre pages and smaller than the page below it so that when viewed in said open condition with the smallest of the pages uppermost, at least one of each of the edges of the pages parallel to the spine and below the smallest pages is visible and displays identifying coding corresponding to that used for one of the sections appearing on the centre pages, at least some of the pages below the centre pages consisting of at least two folded panels proportioned so that adjacent pages can be opened and after arranging in face-to-face relationship, the pages can be refolded to close the map while maintaining this face-to-face relationship, whereby in use a section can be selected from the display of the subject and using the identifying coding to find the relevant page, this page and an adjacent page can be opened out to either side of the spine to display the selected one of the said sections to a larger scale without damaging the pages.

2. A map as claimed in claim 1 and further comprising a place index which provides a two-component grid reference for each place, and in which the said edges of the pages carry one component of the grid reference to lead the user to a particular section containing a place selected from the index.

3. A map as claimed in claim 2 in which the second components of the grid references are found at the tops of the pages.

* * * * *